(12) United States Patent
Dixon et al.

(10) Patent No.: US 7,657,781 B1
(45) Date of Patent: Feb. 2, 2010

(54) SYSTEM AND METHOD FOR PROVIDING REDUNDANT DATA LOAD SHARING IN A DISTRIBUTED NETWORK

(75) Inventors: Walter G. Dixon, Fuquay-Varina, NC (US); Robert A. Mackie, Cary, NC (US); Thomas R. Bakita, Raleigh, NC (US); Dwight R. Frye, Jr., Cary, NC (US); John G. White, Cary, NC (US); Keith R. Schomburg, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 1084 days.

(21) Appl. No.: 10/627,858

(22) Filed: Jul. 25, 2003

(51) Int. Cl.
*G06F 11/00* (2006.01)
(52) U.S. Cl. .................. 714/6; 714/7; 714/15
(58) Field of Classification Search ............ 714/4, 714/6, 7, 11, 13, 15
See application file for complete search history.

(56) References Cited

U.S. PATENT DOCUMENTS

| | | | |
|---|---|---|---|
| 4,584,639 A | 4/1986 | Hardy | |
| 5,117,350 A | 5/1992 | Parrish et al. | |
| 5,473,608 A | 12/1995 | Gagne et al. | |
| 5,613,071 A | 3/1997 | Rankin et al. | |
| 5,812,748 A * | 9/1998 | Ohran et al. | 714/4 |
| 5,862,357 A | 1/1999 | Hagersten et al. | |
| 5,964,886 A * | 10/1999 | Slaughter et al. | 714/4 |
| 6,105,116 A * | 8/2000 | Mori | 711/162 |
| 6,134,673 A * | 10/2000 | Chrabaszcz | 714/13 |
| 6,226,671 B1 | 5/2001 | Hagersten et al. | |
| 6,442,706 B1 * | 8/2002 | Wahl et al. | 714/6 |
| 6,442,713 B1 * | 8/2002 | Block et al. | 714/43 |
| 6,453,426 B1 * | 9/2002 | Gamache et al. | 714/4 |
| 6,553,401 B1 * | 4/2003 | Carter et al. | 709/200 |
| 2002/0032883 A1 * | 3/2002 | Kampe et al. | 714/16 |
| 2004/0230862 A1 * | 11/2004 | Merchant et al. | 714/6 |

* cited by examiner

*Primary Examiner*—Joshua A Lohn
(74) *Attorney, Agent, or Firm*—Baker Botts L.L.P.

(57) ABSTRACT

In a distributed network, a data entry is received. The data entry is stored in a first one of a plurality of nodes and replicated in a second one of the plurality of nodes in order to provide data redundancy in the distributed network. In the event of a failure of the second one of the plurality of nodes, the data entry that was replicated therein is re-replicated into a third one of the plurality of nodes in order to maintain data redundancy despite the failure of the second one of the plurality of nodes. Data redundancy can be retained despite the failure of the second one of the plurality of nodes as long as the overall capacity for the distributed network remains above an initial threshold.

26 Claims, 2 Drawing Sheets

SYSTEM AND METHOD FOR PROVIDING REDUNDANT DATA LOAD SHARING IN A DISTRIBUTED NETWORK

TECHNICAL FIELD OF THE INVENTION

The present invention relates in general to data maintenance and more particularly to a system and method for providing redundant data load sharing in a distributed network.

BACKGROUND OF THE INVENTION

In update and query systems requiring real time response, the approach to guarantee the fastest access to data is to hold the data in physical memory. In situations where that data is crucial to the operation of the querying device, redundancy is also implemented such that a failure of a single hardware element storing this information does not prevent subsequent successful queries. This situation is compounded in systems that are highly distributed and where the storage of data is decentralized among peer devices.

Similar problems have been solved in a variety of ways. Many of these solutions rely on a master source for the stored data or at least an ability to re-fetch that data. Such is the case with the use of network caching equipment. In the event of a cache failure, a backup cache simply re-fetches the data from the originating store. In the case of commercial databases, there are replication schemes, journaling, and disk based backups using periodic push/update techniques and write through secondary servers. However, these approaches depend upon a fairly centralized storage system.

A traditional fault tolerant system uses N+1 devices where N devices carry the capacity and the +1 device is a in a hot standby mode. When a failure occurs in one of the N devices, the +1 device takes over but it must disrupt the system to learn the state of the device it is replacing since it cannot know the state of every possible device in the system it might have to replace. As a result, the industry has gone to a 1+1 scheme where every device has its own dedicated backup which maintains its partner's state so that failures can be seamless and not disrupt the system. However, in this scheme, half of the devices are sitting idle and the total system requires 2N devices for implementation.

Another scheme, RAID redundancy, does not require 2N devices but uses a centralized controller. Various categories of redundancy can be configured at the controller to mirror data between storage devices and tolerate individual hardware failure. However, a failure at the controller would produce a devastating effect to the network employing this scheme. Thus, it would be desirable to provide a scheme that avoids system disruptions in the event of a failure while reducing the number of devices that sit idle during normal operation.

SUMMARY OF THE INVENTION

From the foregoing, it may be appreciated by those skilled in the art that a need has arisen for a redundancy scheme that is robust and minimizes idle devices. In accordance with the present invention, a system and method for providing redundant data load sharing in a distributed network are provided that substantially eliminate or greatly reduce disadvantages and problems associated with conventional redundancy schemes.

According to an embodiment of the present invention, there is provided a method for providing redundant data load sharing in a distributed network that includes receiving a data entry and storing the data entry in a first one and a second one of a plurality of nodes. In response to a failure of the second one of the plurality of nodes, the data entry in the failed second one of the plurality of nodes is replicated at a third one of the plurality of nodes in order to maintain data redundancy in the distributed network. Data redundancy can be retained despite node failures as long as a number of operating nodes have sufficient capacity to maintain data redundancy in the distributed system.

The present invention provides various technical advantages over conventional redundancy schemes. For example, one technical advantage is the use of all devices in the system during normal operation without requiring any idle devices to provide backup capabilities. Another technical advantage is to provide redundancy despite a failure in one of the nodes of the system. Yet another technical advantage is the ability to dynamically adjust to the number of operating and failed nodes as needed in order to maintain full functionality of the system. Still another technical advantage is to provide an adaptive approach to providing redundancy such that only one additional device is required, more than one additional device is optional, and all devices share the load.

All devices are peers in a decentralized architecture so that a single device does not control operation in the network and a single failure would not be catastrophic for the network. The overall capacity provided by the plurality of the nodes can be dynamically adjusted up or down on demand by adding or removing nodes without reconfiguring any existing nodes or any central controller. The network of the present invention can adjust from a redundant to a non-redundant mode when the number of nodes reaches a level at which maintaining redundant copies of data is no longer possible. The network would still be in a usable state but data would not be replicated. As new nodes are added or failed nodes are restored to an acceptable operating state, the network is able to re-adjust back to a redundant mode where data can again be replicated. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
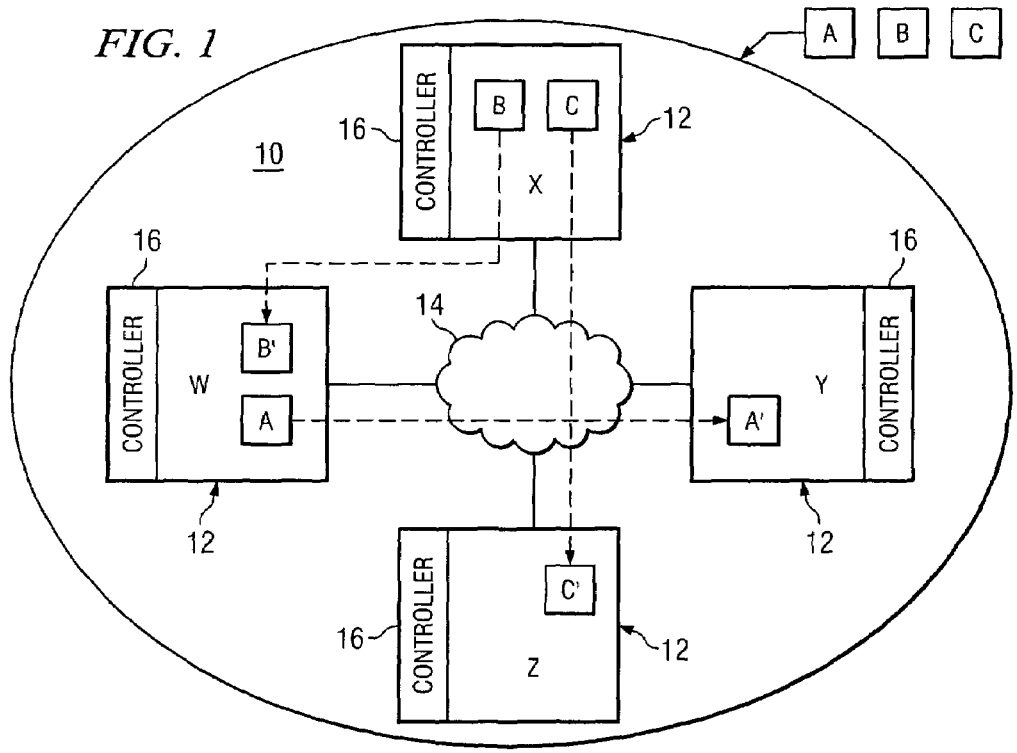
FIG. 1 illustrates a simplified block diagram of a distributed network.

FIG. 1 is a block diagram of a distributed network 10. Distributed network 10 includes a plurality of nodes 12 that may be interconnected by a data network 14. Each of the plurality of nodes 12 includes a controller unit 16 to provide a decentralized controller functionality in order to supervise operation and handle movement of data entries within distributed network 10. The distribution of the controller functionality throughout distributed network 10 at each node 12 ensures that a controller functionality remains present despite a failure of a node 12 and avoids a central controller design whose failure would greatly impede network operation.

In distributed network 10, the plurality of nodes 12 provide a certain capacity to store an original data entry and a replicated data entry. For example, original data entry A is received in distributed network 10 and may be stored in node W. Node W will then copy original data entry A to generate replicated copy A' for storage in another node, in this instance node Y. Similarly, original data entry B may be stored in Node X and replicated data entry B' may be stored in Node W. Also, original data entry C may be stored in Node X and replicated data entry C' may be stored in Node Z. In this manner, an original data entry and its replicated copy are stored at separate nodes. Though used in terms of original and replicated data entries for discussion purposes, there is no distinction made in distributed network 10 as to which data entry was stored first or subsequently replicated. Each data entry includes information as to where its associated data entry is redundantly stored within distributed network 10. In this manner, a first node can learn of the failure of a second node and determine if any of its data entries had a copy stored in the failed second node and initiate replication of any such data entry at one or more other nodes according to available network capacity.

Figure 2:
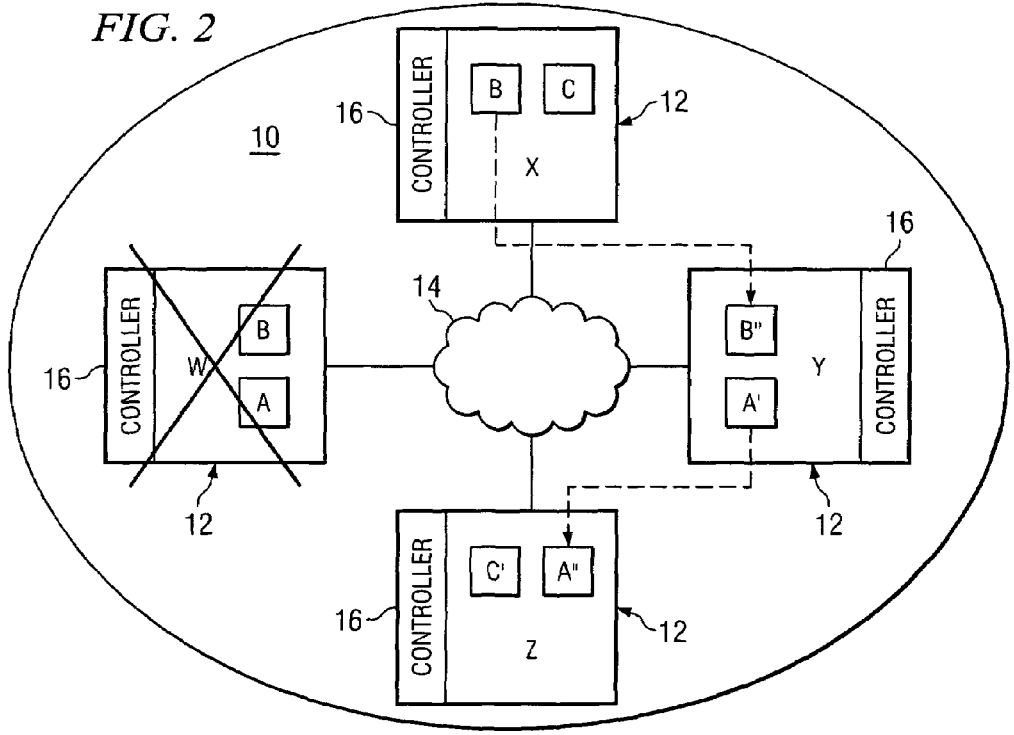
FIG. 2 illustrates a simplified block diagram of the distributed network during failure of a node.

FIG. 2 shows actions taken in distributed network 10 when a failure occurs at a node 12. For purposes of discussion, a failure occurs at Node W. Upon failure of Node W, the remaining nodes 12 receive notification as to the failure of Node W. Each remaining node 12 determines whether it is storing either an original data entry or a replicated data entry associated with data entries stored at failed Node W. If so, then the remaining nodes which have data entries associated with the data entries of failed Node W initiate replicating the appropriate data entry to a different node 12 within distributed network 10. For example, Node X determines that replicated data entry B', associated with its original data entry B, was stored on failed Node W. Node X-copies original entry B to generate re-replicated data entry B" and store re-replicated data entry B" on another working node 12. In this instance, re-replicated data entry B" is stored at Node Y. Re-replicated data entry B" may be stored on any other working node 12 pursuant to capacity restrictions. Similarly, Node Y determines that original data entry A, associated with its replicated data entry A', was stored on failed Node W. Node Y copies replicated data entry A' to generate re-replicated data entry A" for storage on any of the remaining operational nodes 12. In this instance, re-replicated data entry A" is stored at Node Z though it could have easily been stored at Node X.

The capacity of distributed network 10 is based on the number of nodes supported and the amount of data to be stored. Let N be the number of nodes required to store an amount of data D. In distributed network 10, N is three nodes. The fourth, or N+1st, node is a redundant device. Though described as having one additional redundant device, distributed network 10 may have any number of additional redundant devices as desired. The additional N+1st node shares the load during normal operation with the other N nodes. The N+1st node acts as a peer instead of a standby unit and is fully functional at all times in order to enhance scalability and system performance. In this manner, no single node is idle and all nodes provide a functional capability at all times. As new data entries are received, each data entry is stored in two nodes 12 of distributed network 10. Thus, an original data entry and an associated replicated data entry are stored in different locations in distributed network 10. If a node fails, the remaining nodes 12 determine the best course of action based on the remaining physical capacity of distributed network 10. As shown above, the failure of a node 12 results in the data entries at the failed node being re-replicated across the remaining N nodes in order to retain both capacity and high availability.

Figure 3:
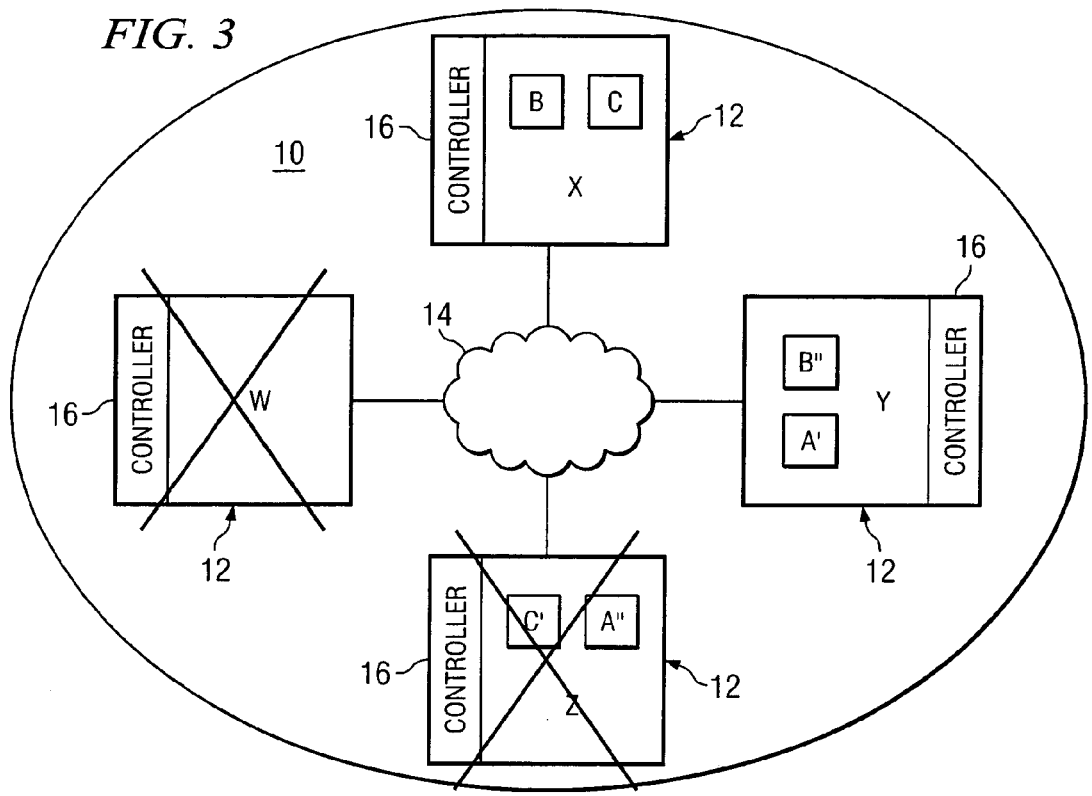
FIG. 3 illustrates a simplified block diagram of the distributed network during failure of another node.

FIG. 3 shows the situation where another node fails in distributed network 10. If the minimum number of nodes N in distributed network 10 is 3, then there may be insufficient capacity to replicate the data entries of Node Z at other nodes 12 due to a failure of Node Z after the failure of Node W. In this situation, there still remains within distributed network 10 at least one copy of each data entry received in the remaining operational nodes 12. Thus, at this point no data entry has been lost as a result of a failure of a node 12. As a new data entry is received, at least one occurrence of the new data entry will be stored in distributed network 10 but a second occurrence will most likely not be generated until the capacity of distributed network 10 is returned to its initial minimum level. There may be complex capacity decisions made that allow for replication of data entries despite the failure of a node 12 until space to do so is exhausted. Distributed network 10 may dynamically adjust capacity downward at this point to account for the failure of a node 12. Additional node failures may likewise reduce overall system capacity and actual data may be lost. However, for N being 3, distributed network 10 can survive the loss of two nodes 12 and still maintain at least one occurrence of each data entry. Distributed network 10 can survive more than two node failures if there were more than one redundant node provisioned. Any second occurrences of data entries in distributed network 10 may be subsequently replaced by newly received data entries until the initial minimum capacity is restored. The point at which redundancy can no longer be maintained is dependent upon the number of available remaining nodes and the capacity of each of the remaining nodes.

Figure 4:
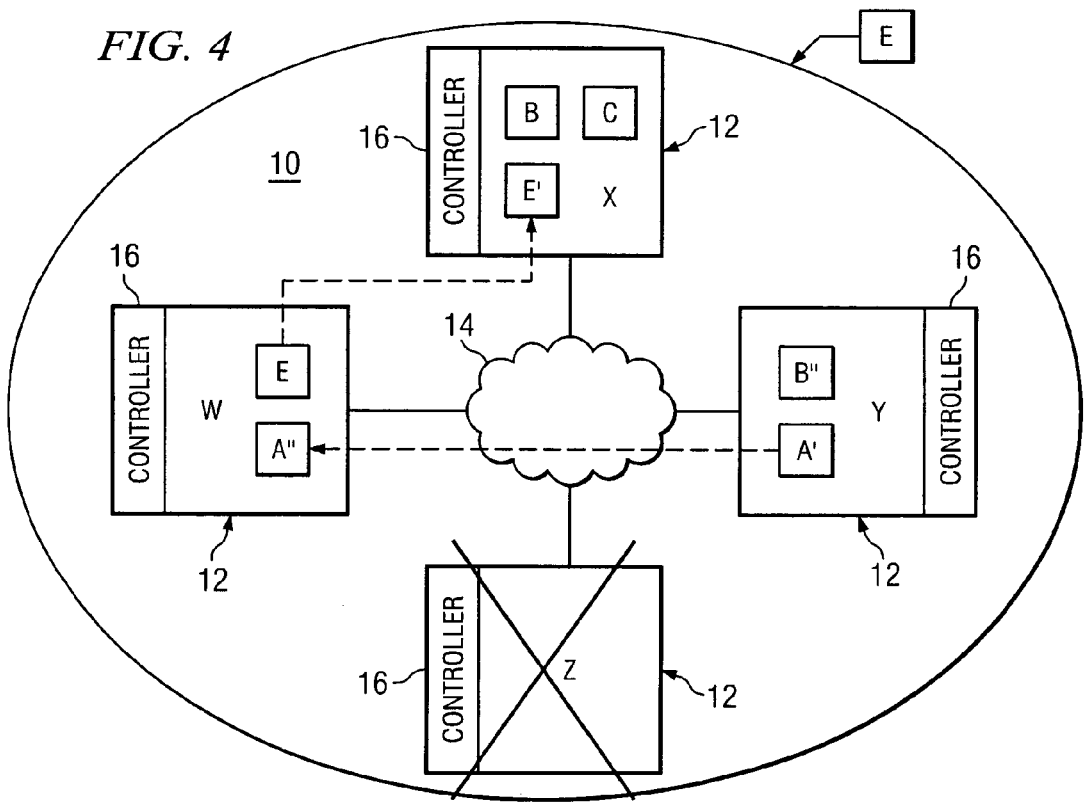
FIG. 4 illustrates a simplified block diagram of the distributed network during recovery of the failed node.

FIG. 4 shows actions taken in distributed network 10 during recovery of Node W or the addition of a new node in distributed network 10. Node W now becomes a functional participant within distributed network 10 for sharing the load during normal operations. Previous data entries in Node W at the time of its failure are no longer considered to be present in Node W upon its recovery. As new data entries are received, they may be stored in Node W as an original data entry or a replicated data entry. For example, data entry E may be received and stored in Node W. Node W generates replicated data entry E' for storage in another node 12, here in Node X. Also, if the failure of Node W had forced distributed network 10 to prevent replication of data entries due to capacity limitations, there may be a data entry A' that has no associated replicated data entry. If the recovery of Node W now provides the necessary system capacity for data replication, nodes 12 having data entries without associated replicated data entries may generate associated replicated data entries for storage at other nodes 12. For example, Node Y has data entry A' without an associated replicated data entry. Upon determining that distributed network 10 now has sufficient capacity for replication as a result of the addition or recovery of Node W, Node Y generates replicated data entry A for storage in another node 12. In the case shown, replicated data entry A" is stored in Node W though it could have been stored in any other node 12 according to space limitations. Similarly, data entry C in Node X may be replicated if available redundant capacity has been recovered as a result of the recovery of Node W.

As failed nodes recover, distributed network 10 may automatically determine in a distributed manner to increase capacity and resume redundant storage for high availability. Thus, upon recovery, newly received data entries may be replicated so that two occurrences are available within distributed network 10. Also, previously received data entries that were not replicated due to insufficient capacity may become replicated as capacity is recovered in distributed network 10.

A node can be any data repository which may be part of a system that performs other functions or may be specifically intended to be used as storage. A node has a fixed capacity P and is designed to have additional storage to support replicates for its peer nodes. A network of N nodes is intended to support D discrete items of data where D is less than or equal to N times P. All nodes share in processing of the algorithm for storage and replication of data entries as equal peers. The adaptive redundancy scheme described herein may be performed in software modules distributed among nodes 12. As nodes come and go, the software modules automatically and dynamically determine courses of action to adaptively reduce capacity, maintain redundancy and availability of data, and restore capacity all based on provisioned capacity for distributed network 10 and the physical limitations at each node 12. Upon each failure and recovery, network behavior and capacity are recomputed.

Thus, it is apparent that there has been provided, in accordance with the present invention, a system and method for providing redundant data load sharing in a distributed network that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims. Moreover, the present invention is not intended to be limited in any way by any statement made herein that is not otherwise reflected in the appended claims.

What is claimed is:

1. A method for providing redundant data load sharing in a distributed network, comprising:
   receiving one or more original data entries at a respective one of a plurality of nodes;
   storing each original data entry in its respective one of the plurality of nodes;
   generating a replicated data entry from each original data entry at its respective one of the plurality of nodes;
   storing each replicated data entry in a node different from where its associated original data entry is stored, each original data entry including information as to a location of its associated replicated data entry, each replicated data entry including information as to a location of its associated original data entry;
   identifying at a particular one of the plurality of nodes a failure of another one of the plurality of nodes;
   determining whether the particular one of the plurality of nodes includes an original data entry or a replicated data entry having information as to the location of a replicated data entry or an original data entry respectively that matches an identified failed node;
   generating a re-replicated data entry in the particular one of the plurality of nodes for storage at a separate working one of the plurality of nodes in response to the information matching the identified failed node.

2. The method of claim 1, further comprising:
   determining whether there is sufficient capacity in the distributed network to handle data entry replication in response to the identified failed node.

3. The method of claim 2, further comprising:
   preventing replication of the original or replicated data entry at the separate working one of the plurality of nodes in response to insufficient capacity in the distributed network.

4. The method of claim 3, further comprising:
   dynamically adjusting the capacity of the distributed network in response to the identified failed node in order to store new original data entries without replication.

5. The method of claim 3, further comprising:
   identifying a recovery of the identified failed node;
   performing storage and replication of subsequently received original data entries in response to the recovery of the identified failed node.

6. The method of claim 5, further comprising:
   adjusting the capacity of the distributed network in response to the recovery of the identified failed node.

7. The method of claim 5, further comprising:
   performing replication of those data entries previously stored but not replicated as a result of the recovery of the identified failed node.

8. The method of claim 1, further comprising:
   identifying a recovery of the identified failed node;
   including the recovered identified failed node in the storage and replication of subsequent original data entries.

9. The method of claim 1, further comprising:
   establishing a capacity for the distributed network, the capacity representing an amount of data to be stored in the distributed network;
   establishing a minimum number of the plurality of nodes required to provide redundancy in the distributed network.

10. The method of claim 9, wherein at least a single occurrence of all data entries are maintained in the plurality of nodes when the number of plurality of nodes falls to one less than the minimum number.

11. A system for providing redundant data load sharing in a distributed network, comprising:
    a plurality of nodes operable to receive and store two copies of a data entry, wherein the two copies of a data entry are stored in separate nodes, each data entry including information as to a location of its associated data entry copy, each of the plurality of nodes operable to identify a failure of any node, each node operable to determine whether it includes a data entry having information as to the location of its associated data entry copy that matches an identified failed node, each node operable to generate a re-replicated data entry for storage in a separate working one of the plurality of nodes in response to having a data entry with information that matches an identified failed node.

12. The system of claim 11, wherein each node includes a distributed control function operable to control storage and replication of data entries.

13. The system of claim 11, wherein each node is operable to determine whether there is sufficient capacity in the distributed network to handle data entry replication in response to the identified failed node.

14. The system of claim 13, wherein each node is operable to prevent replication of a data entry for storage at a separate working one of the plurality of nodes in response to insufficient capacity in the distributed network.

15. The system of claim 14, wherein the plurality of nodes are operable to dynamically adjust the capacity of the distributed network in response to the identified failed node in order to store new data entries without replication.

16. The system of claim 11, wherein the capacity of each of the plurality of nodes is adjusted in response to an addition of a new node or failure of an existing node.

17. A system for providing redundant data load sharing in a distributed network, comprising:
    means for receiving one or more original data entries at a respective one of a plurality of nodes;
    means for storing each original data entry in its respective one of the plurality of nodes;
    means for generating a replicated data entry from each original data entry at its respective one of the plurality of nodes;
    means for storing each replicated data entry in a node different from where its associated original data entry is stored, each original data entry including information as to a location of its associated replicated data entry, each replicated data entry including information as to a location of its associated original data entry;
    means for identifying at a particular one of the plurality of nodes a failure of another one of the plurality of nodes;
    means for determining whether the particular one of the plurality of nodes includes an original data entry or a replicated data entry having information as to the location of a replicated data entry or an original data entry respectively that matches an identified failed node;
    means for generating a re-replicated data entry in the particular one of the plurality of nodes for storage at a separate working one of the plurality of nodes in response to the information matching the identified failed node.

18. The system of claim 17, further comprising:
    means for determining whether there is sufficient capacity in the distributed network to handle data entry replication in response to the identified failed node.

19. The system of claim 18, further comprising:
    means for preventing replication of the original or replicated data entry at the separate working one of the plurality of nodes in response to insufficient capacity in the distributed network.

20. The system of claim 19, further comprising:
    means for dynamically adjusting the capacity of the distributed network in response to the identified failed node in order to store new original data entries without replication.

21. The system of claim 19, further comprising:
    means for identifying a recovery of the identified failed node;
    means for performing storage and replication of subsequently received original data entries in response to the recovery of the identified failed node.

22. A computer readable medium including code for providing redundant data load sharing in a distributed network, the code operable to:
    receive one or more original data entries at a respective one of a plurality of nodes;
    store each original data entry in its respective one of the plurality of nodes;
    generate a replicated data entry from each original data entry at its respective one of the plurality of nodes;
    store each replicated data entry in a node different from where its associated original data entry is stored, each original data entry including information as to a location of its associated replicated data entry, each replicated data entry including information as to a location of its associated original data entry;
    identify at a particular one of the plurality of nodes a failure of another one of the plurality of nodes;
    determine whether the particular one of the plurality of nodes includes an original data entry or a replicated data entry having information as to the location of a replicated data entry or an original data entry respectively that matches an identified failed node;
    generate a re-replicated data entry in the particular one of the plurality of nodes for storage at a separate working one of the plurality of nodes in response to the information matching the identified failed node.

23. The computer readable medium of claim 22, wherein the code is further operable to:
    determine whether there is sufficient capacity in the distributed network to handle data entry replication in response to the identified failed node.

24. The computer readable medium of claim 23, wherein the code is further operable to:
    prevent replication of the original or replicated data entry at the separate working one of the plurality of nodes in response to insufficient capacity in the distributed network.

25. The computer readable medium of claim 24, wherein the code is further operable to:
    dynamically adjust the capacity of the distributed network in response to the identified failed node in order to store new original data entries without replication.

26. The computer readable medium of claim 24, wherein the code is further operable to:
    identify a recovery of the identified failed node;
    perform storage and replication of subsequently received original data entries in response to the recovery of the identified failed node.

* * * * *

UNITED STATES PATENT AND TRADEMARK OFFICE
CERTIFICATE OF CORRECTION

PATENT NO. : 7,657,781 B1
APPLICATION NO. : 10/627858
DATED : February 2, 2010
INVENTOR(S) : Dixon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 557 days.

Signed and Sealed this

Thirtieth Day of November, 2010

David J. Kappos
*Director of the United States Patent and Trademark Office*